United States Patent [19]

Caplan et al.

[11] Patent Number: 5,080,782
[45] Date of Patent: * Jan. 14, 1992

[54] APPARATUS FOR BIOREMEDIATION OF SITES CONTAMINATED WITH HAZARDOUS SUBSTANCES

[75] Inventors: Jason A. Caplan; Eric K. Schmitt; Donald R. Malone, all of Raleigh, N.C.

[73] Assignee: Environmental Science & Engineering, Inc., Raleigh, N.C.

[*] Notice: The portion of the term of this patent subsequent to Feb. 12, 2008 has been disclaimed.

[21] Appl. No.: 363,076

[22] Filed: Jun. 8, 1989

[51] Int. Cl.$^5$ .............................................. C02F 3/04
[52] U.S. Cl. ................................... 210/151; 210/170; 210/194; 210/258
[58] Field of Search ........ 210/603, 610, 611, 615–619, 210/747, 150, 151, 170, 194, 197, 205, 258

[56] References Cited

U.S. PATENT DOCUMENTS

| | | | |
|---|---|---|---|
| 3,616,204 | 10/1971 | Linn | 195/2 |
| 3,846,290 | 11/1974 | Raymond | 210/11 |
| 4,385,121 | 5/1983 | Knowlton | 435/244 |
| 4,401,569 | 8/1983 | Jhaveri et al. | 210/610 |
| 4,545,909 | 10/1985 | Atkinson et al. | 210/618 |
| 4,683,064 | 7/1987 | Hallberg et al. | 210/747 |
| 4,765,902 | 8/1988 | Ely et al. | 210/610 |
| 4,925,552 | 5/1990 | Bateson et al. | 210/150 |

Primary Examiner—Thomas Wyse
Attorney, Agent, or Firm—Lahive & Cockfield

[57] ABSTRACT

Disclosed is an apparatus and method for the continuous bioremediation of sites contaminated with a hazardous substances. The apparatus includes a subsurface pumping system, for removing the hazardous substance contained in a phase separate from groundwater, which is integrated with a means for microbiologically treating the contaminated site. The means for microbiologically treating the contaminated site preferably includes hazardous substance degrading microorganisms.

In operation, a subsurface pumping system separates, either above or below-ground, a free-product phase from the contaminated groundwater. The separated free-product is stored for off-site disposal. Contaminated groundwater is fed into the microbiological treatment system for further treatment and eventual recirculation into the contaminated site.

7 Claims, 5 Drawing Sheets

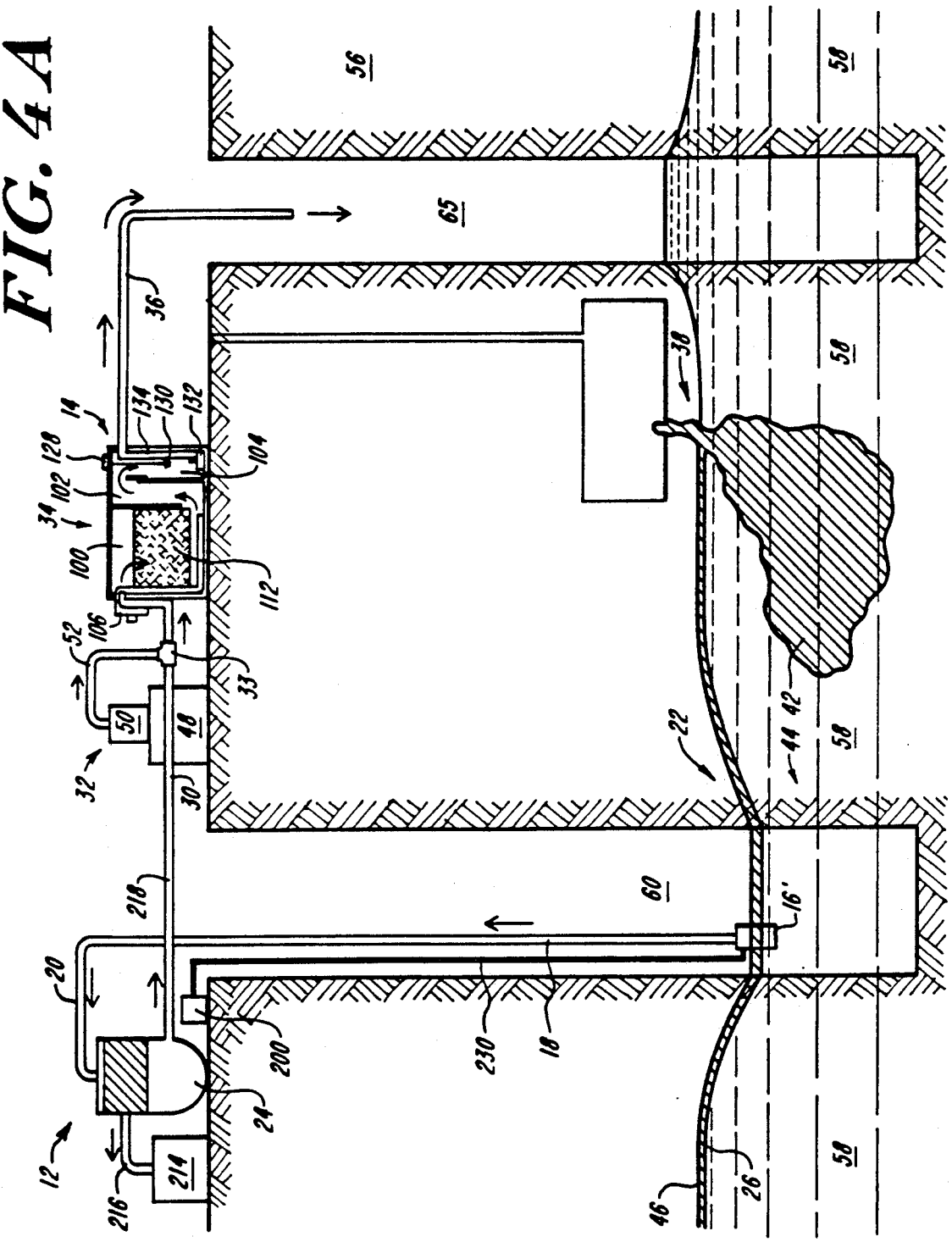

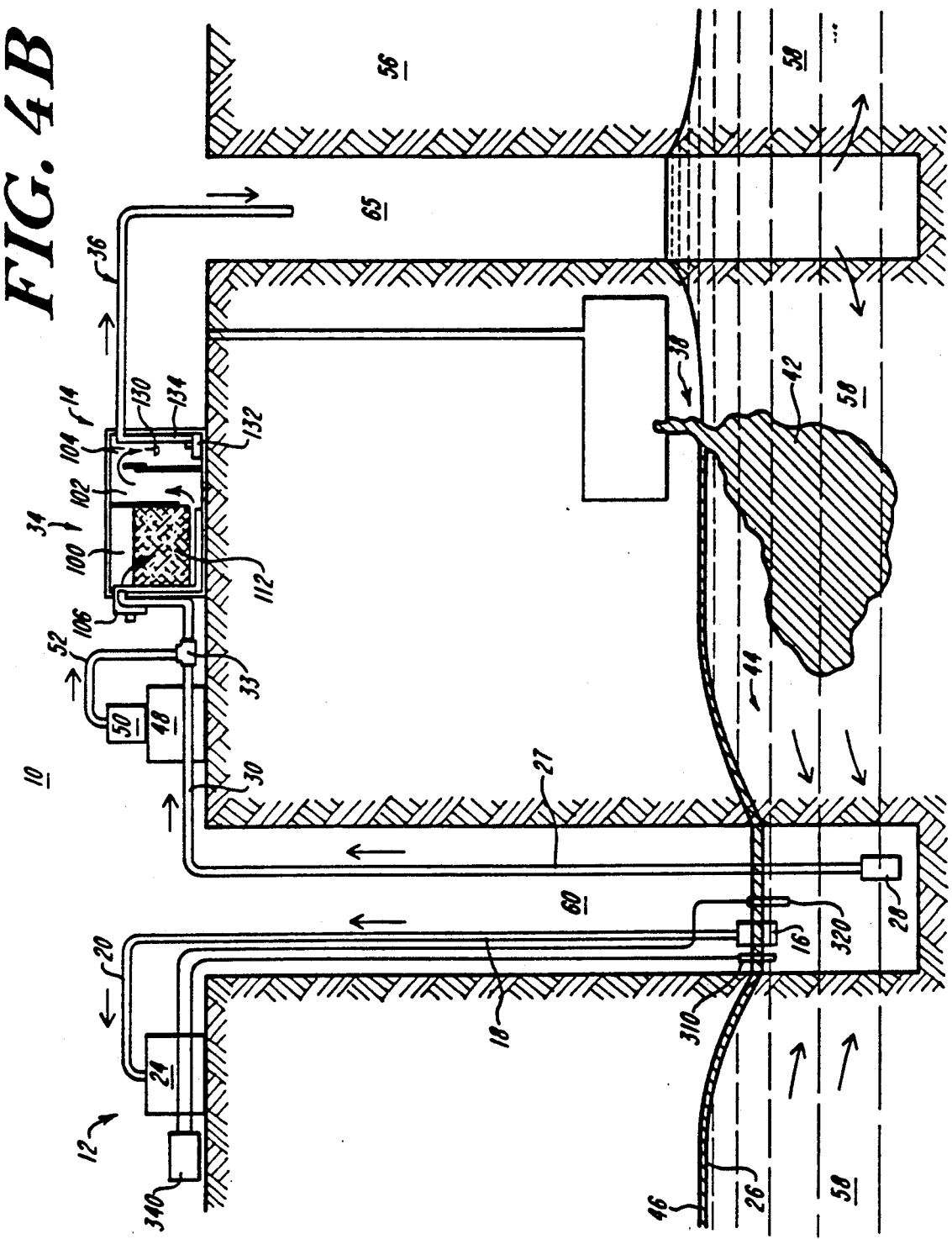

APPARATUS FOR BIOREMEDIATION OF SITES CONTAMINATED WITH HAZARDOUS SUBSTANCES

BACKGROUND OF THE INVENTION

The present invention relates to a method and apparatus for treating a site contaminated with a hazardous substance. More particularly, the invention relates to a method and apparatus for microbiologically remediating soil and groundwater in a site contaminated with a hazardous substance.

Worldwide, the storage and transportation of hazardous substances requires countless tanks and pipelines. Substances typically processed in these facilities include petroleum distillates, industrial solvents, and industrial wastes. Due to the dangers presented by storing and transporting concentrated solutions of these materials, engineers and government agencies conduct extensive research and development to insure the tanks and pipelines used will effectively and safely contain these materials. Weathering and unforeseen engineering limitations, however, often cause the facilities to fail, resulting in the release of chemicals into the environment.

The failure of storage tanks and pipelines impacts on the physical and economic vitality of the contaminated area. The release of concentrated chemical solutions typically causes extensive damage to the local ecosystem by contaminating or killing indigenous plant and animal life. More remote ecosystems may be affected if the contamination migrates away from the site by entering a local groundwater flow. Further, local laws often require that the contaminated areas be remediated, and certified as such, prior to sale or rental of the contaminated property. These laws often result in land being left fallow for years or decades. In extreme cases, the inability to remediate contaminated sites renders industrial or residential areas uninhabitable, forcing owners and employees to evacuate the area.

Several methods are currently employed to biologically remediate sites contaminated with hazardous substances.

One approach to the bioremediation of contaminated sites involves the use of microorganisms indigenous to the subsurface environment. In particular, this technique involves supplying the indigenous microorganisms with gases and nutrients to increase their growth rate in situ. As the indigenous microbial population increases, more contaminant is oxidized. Once the contaminant is totally consumed, gas and nutrient supplies are terminated causing the microbial population to return to background levels. Exemplary of this technique are U.S. Pat. Nos. 3,846,290, 4,385,121, and 4,765,902. Although these methods achieve remediation over extended periods of use, the time required to build-up an effective in situ bioremediating culture at the contamination site creates a significant delay before effective treatment commences. Since delayed treatment permits the contaminant to remain in the ecosystem for a longer period of time, allowing additional migration and damage as a result, methods having inherent lag periods are less desirable.

Another method involves supplementing the indigenous microbial population with naturally occurring, or genetically altered, exogenous microorganisms. For example, if the primary area of contamination is within several centimeters of the ground surface, remediation is possible by discing or harrowing the area and then applying a solution containing nutrients and microorganisms. The inoculum grows by feeding on the nutrients and contaminants. Initial treatment, however, is often delayed because the contaminated area's toxicity kills a significant portion of the treating inoculum. Additional delays may result if the exogenous microbial population can not compete with indigenous populations. Once the microorganisms exhaust the food supply, i.e., the nutrients and contaminants, they perish leaving no lingering biological effects. U.S. Pat. No. 3,616,204 provides additional data and procedural aspects of this method.

Subsurface spills may also be remediated using a supplementary inoculum of microorganisms, however, the depth of the spill is problematic. In particular, because the contaminant's depth separates the remediating inoculum from needed air and nutrients, gas and nutrient supply systems become necessary. The relative closeness of the contamination to groundwater flows, as compared to surface spills, also necessitates expedited treatment of the contamination. To meet these requirements, Jhaveri U.S. Pat. No. 4,401,569 discloses a complex system of trenches, recirculation wells and gas injection wells, in combination with an above-ground treatment facility. Methods such as that disclosed in Jhaveri are effective if used for sufficient periods, however, the time required to construct the required trench systems creates an undesirable lag period before commencement of remediation. Additional delays also result if the treating microbial culture is killed or inhibited by toxic overloadings of the contaminant during the start-up phase. The efficacy of this technique is still further limited by engineering and safety limitations on trench depth.

Accordingly, it is an object of the invention to present a method and apparatus for the bioremediation of sites contaminated with hazardous substances.

It is a further object of the invention to present a method and apparatus capable of commencing bioremediation within a short period after arrival at a hazardous substance contaminated site.

It is yet another object of the invention to present a method and apparatus which is effective at ground level and at depths substantially below the ground surface.

It is yet a further object of the invention to present a method and apparatus which permits continual, efficient treatment of a contaminated site by protecting the treating microbial inoculum from toxic overloadings of the contamination, and generating an increased rate of remediation in the subsurface environment.

SUMMARY OF THE INVENTION

The present invention attains the preceding objects and features by providing an apparatus and method for the bioremediation of sites contaminated with a hazardous substance, e.g., a substance which may be classified as toxic, corrosive, irritant, flammable or combustible, or generating pressure in the course of decomposition. The basic approach is to remediate the contaminated site using an interactive system comprising, in combination, a subsurface pumping system, which removes a two phase mixture rich in the hazardous substance, and a vessel, i.e., bioreactor, which removes dissolved constituents of the hazardous substance in the groundwater. The combination efficiently protects the bioremediating culture of microorganisms from toxic overloadings of the hazardous substance, permitting continuous remediation of the contaminated site.

By removing a two phase mixture rich in a hazardous substance from groundwater present at the site, the subsurface pumping system serves to protect the biodegrading microorganisms from toxic overloadings of the hazardous substance, thus increasing the overall speed and efficiency of the apparatus. The subsurface pumping system includes a subsurface pump having an intake nozzle which may be positioned proximate to a groundwater/hazardous substance interface. A well pipe, as well as an above-ground piping system, interconnects the intake nozzle to a collection tank. The collection tank may be a float-controlled holding tank or phase separator.

The means for microbiologically treating the site comprises a vessel, a bioreactor, containing microorganisms which biodegrade contaminants dissolved in the groundwater. Groundwater isolated by the subsurface pumping system, or removed from below the groundwater/hazardous substance interface, may be treated in the bioreactor. The microbiological treatment means also includes piping and pumping apparatuses to remove and recirculate groundwater from and to the contaminated site. Preferably, the recirculating system is positioned such that the treated groundwater will migrate through the hazardous substance-contaminated site toward the removal piping system. This closed-loop recirculation system increases the rate of remediation in the subsurface environment.

The bioreactor preferably contains a viable culture of microorganisms. Gas and nutrient addition systems, typically automated, maintain and assist in the proliferation of the culture. The culture of microorganisms preferably comprises microorganisms fixed to a support media in the vessel and microorganisms, arising from the fixed microorganisms, which slough off the support media and disperse into the recirculating groundwater. Preferably, the culture of fixed microorganisms continually proliferates producing a substantially constant microbial mass within the vessel.

In another aspect, the invention contemplates a process for bioremediating sites contaminated with a hazardous substance, especially hydrocarbons and their derivatives. The process comprises concurrently removing two solutions from the contaminated site; one solution includes an aqueous phase and a non-aqueous, hazardous substance-containing phase, the other solution comprises an aqueous phase contaminated with dissolved constituents of the hazardous substance. Removal of the non-aqueous phase prior to entrance into the aboveground bioreactor assures continuous biodegradation by protecting the culture of microorganisms from toxic overloadings, i.e., high concentrations, of the hazardous substance.

In operation, a subsurface pump draws contaminated water into an intake nozzle positioned proximate to the groundwater/hazardous substance interface. The removed water flows up a well pipe, through an aboveground piping system, and into either a holding tank or phase-separator. Groundwater isolated by the phase-separator may flow into the bioreactor for further treatment. Hazardous substances may be stored in the phase-separator tank until appropriate disposal is arranged.

Microbiological treatment of the contaminated site involves the use of microorganisms to bioremediate contaminants dissolved in the groundwater. Using a total fluids pump, installed at a location below the groundwater/hazardous substance interface, the combined groundwater/hazardous substance is recovered and pumped to an aboveground phase separator tank. This phase separator tank isolates the contaminated groundwater, containing dissolved constituents, which is then treated in the bioreactor. Alternatively, contaminated groundwater containing dissolved constituents may be selectively recovered by a dual pumping system. A second pump is utilized to recover the free-product hazardous substance by installation within the free-product layer within the recovery well. Nutrient compounds are then added to the contaminated groundwater. These nutrients, and gases added within the bioreactor, enhance the growth of the biodegrading microorganisms. Treatment essentially comprises culturing the microorganisms in a vessel (i.e., a bioreactor) using the contaminated groundwater as a growth medium. In particular, the microorganisms grow by biodegrading the hazardous substances in the groundwater and utilizing the carbon constituents for cellular metabolism. Recirculation of the groundwater occurs after completion of the treatment step.

During treatment the microbial culture grows producing a culture of microorganisms comprising microorganisms fixed to a support media in the vessel and microorganisms, arising from those fixed to the support media, which slough off and disperse into the groundwater. Preferably, the microorganisms fixed to the support media constitute a substantially constant microbial biomass. Recirculated into the contaminated site, along with the dissolved gases and nutrients, the sloughed microorganisms act as a seed culture performing in situ remediation of contaminated soil and rock strata, as well as groundwater. Preferably, some of the microorganisms flow back to the groundwater removal well thus establishing an open bioremediation circulatory system.

The process of the present invention may be performed at any site contaminated by hazardous substances degradable by microorganisms. Typical hazardous substances which may be bioremediated using the process include alcohols, aromatics, carbohydrates, ketones, petroleum hydrocarbons, phenols, phthalates, chemical solvents, chlorinated compounds, detergents and mixtures thereof.

The combination of the subsurface pumping system and microbiological treatment means, operated as described herein, may be used to remove both high concentrations of hazardous substances, especially when located in a separate phase, and bioremediate lower concentrations of hazardous substances dissolved in the groundwater or adsorbed into the soil. Further, by integrating a subsurface pumping system into the apparatus, toxic concentrations of the hazardous substances are removed and the microbial culture protected. Thus, the combination assures continual bioremediation without downtime to reinoculate the bioreactor due to damage from toxic levels of the hazardous substance.

BRIEF DESCRIPTION OF THE DRAWINGS

FIG. 4A is a schematic illustrating the flow of contaminated groundwater through the subsurface pumping system of FIG. 2A and the bioreactor; and FIG. 4B is a schematic illustrating the flow of contaminated groundwater through the subsurface pump system of FIG. 2B and the bioreactor.

In the FIGURES, like reference characters indicate corresponding parts.

DETAILED DESCRIPTION

The invention features an apparatus and method for the bioremediation of sites contaminated with a hazardous substance. The invention includes both a subsurface pumping system and a microbiological treatment means which interact to protect the bioremediating culture from toxic overloadings of the hazardous substance during operation, thus insuring continuous and efficient remediation. The interaction of these subunits also produces an increased rate of remediation in the subsurface environment when compared with other biological, chemical, and physical remediation techniques.

Figure 1:
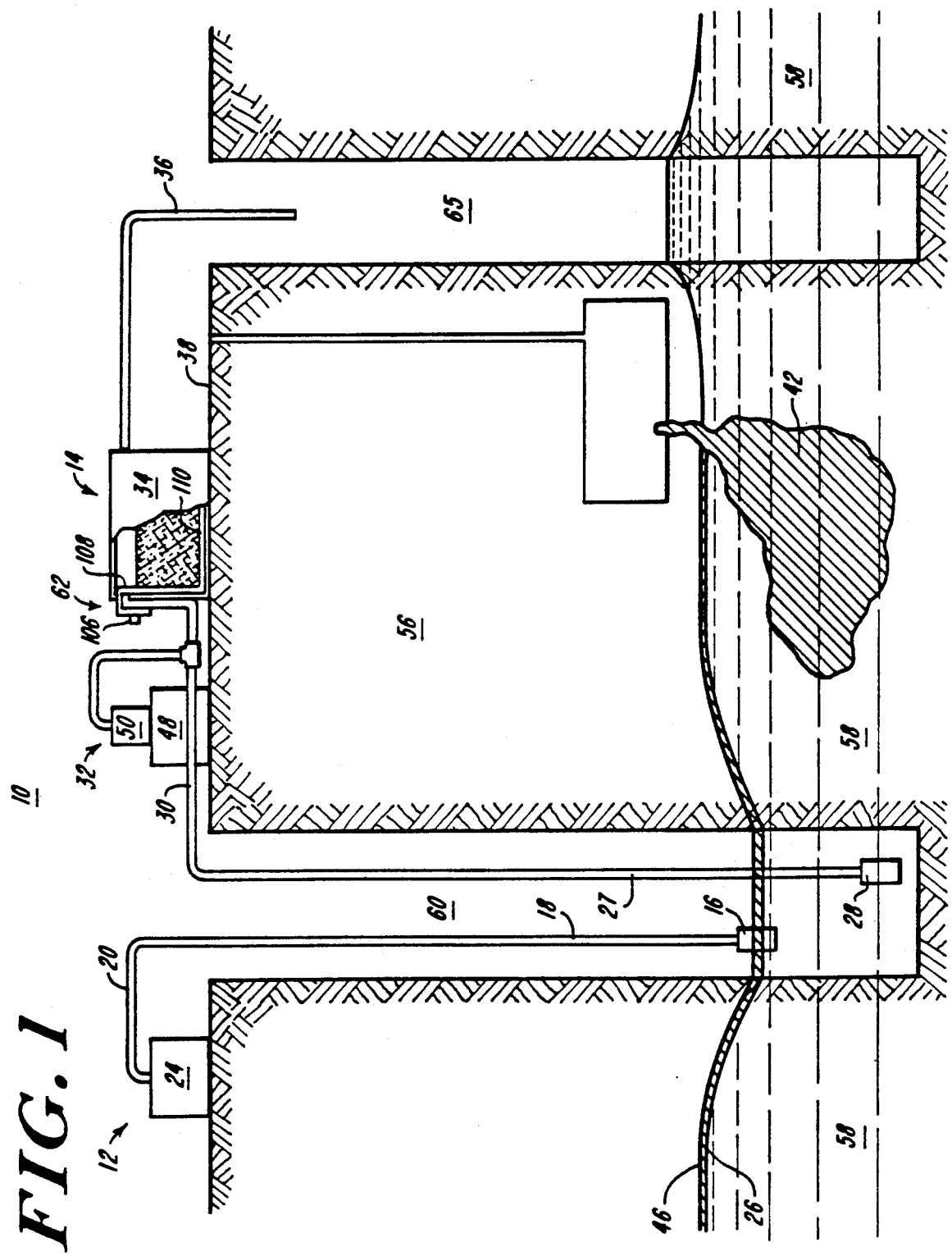
FIG. 1 is a schematic drawing of the remediation apparatus of the invention, having a partial cut-away view of a bioreactor useful in the invention.

Referring to FIG. 1 there is shown a bioremediation apparatus 10 located at a contaminated site 38. The bioremediation apparatus 10 includes a subsurface pumping system 12, for removing hazardous substances located in a separate or separable phase, and a microbiological treatment apparatus 14, for biodegrading contaminants dissolved in groundwater 58.

Subsurface pumping system 12 preferably comprises a pump 16' and collection tank 24 connected by well pipe 18 and above-ground piping system 20. Preferably, pump 16' is located proximate to groundwater/hazardous substance interface 26. Recovery well 60 encloses pump 16' and well pipe 18, isolating them from adjacent soil and rock strata 56.

The microbiological treatment system 14 broadly includes groundwater recovery pump 28 connected to intake pipe 27, nutrient addition system 32, gas injection system 62, bioreactor 34, and aboveground effluent piping system 36. A piping system 30 connects intake pipe 27, nutrient addition system 32, and bioreactor 34. Groundwater recovery pump 28 is preferably located proximate to hazardous substance plume 42 and below groundwater/hazardous substance interface 26. Recovery well 60 also encloses intake pipe 27 and groundwater recovery pump 28. Nutrient addition system 32 includes a reservoir tank 48 and nutrient feed pump 50. The gas injection system 62 includes a blower 106; blower 106 pumps gases into bioreactor 34 through piping 108 and gas distribution system 110. Effluent piping system 36 exits bioreactor 34 and connects to recirculation well/infiltration gallery 65, which terminates within, or proximate to, the hazardous substance plume 42.

Figure 2A:
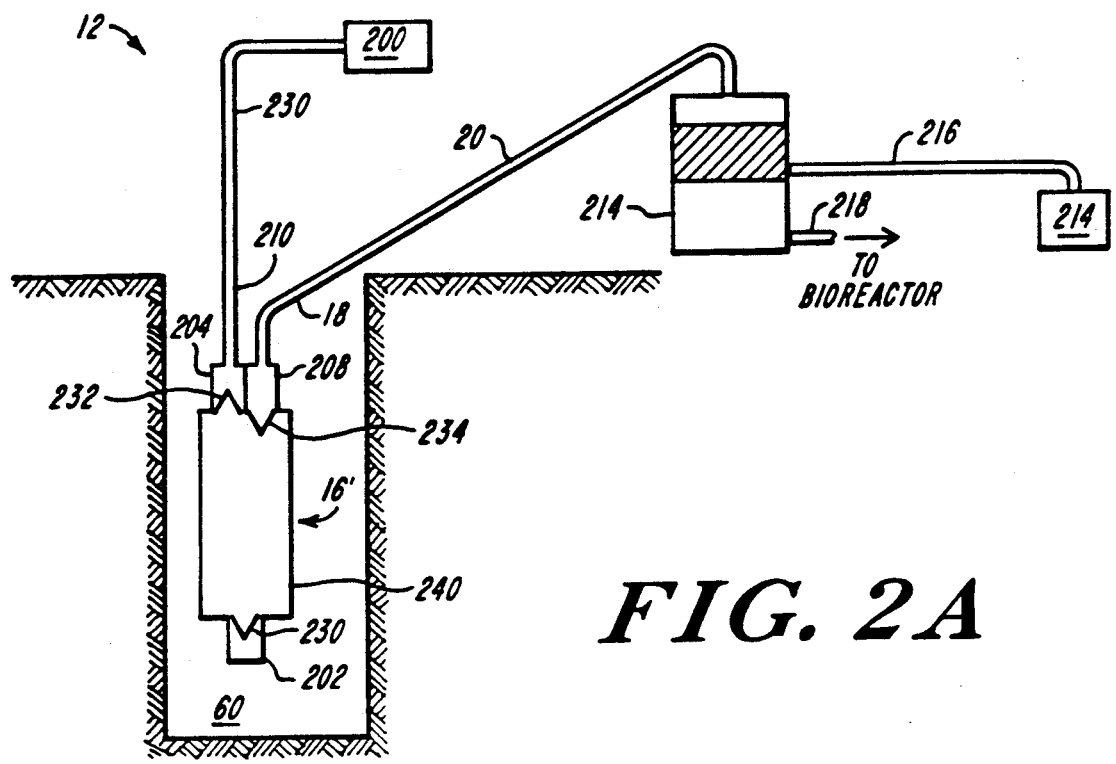
FIG. 2A is a partly schematic illustration of a total fluids type subsurface pumping system useful in the invention.

The subsurface pumping system 12 of FIG. 2A performs total-fluids recovery and separates the removed two phase mixture above-ground. Subsurface pumping system 12 comprises a total fluids pump 16 which is connected to collection tank 24 by well pipe 18 and above-ground piping system 20. The collection tank 24, which preferably is a phase-separator tank, may be connected to a hydrocarbon holding tank 214 and the bioreactor 34 via lines 216 and 218 respectively.

Total fluids pump 16 is a pneumatically operated pump having a closed-end cylindrical chamber 240 and four ports 202, 204, 208, and 210. Ports 202, 204, and 208 contain check valves 230, 232, and 234 respectively. Port 210 is connected to pump control 200 by air line 230. Pump control 200 controls the rate at which total fluids pump 16 removes the two-phase mixture from contaminated site 38. A typical total fluids pump 16 of the type described herein is manufactured by Ejector Systems, Incorporated and sold under the name Total Fluids Operations.

Figure 2B:
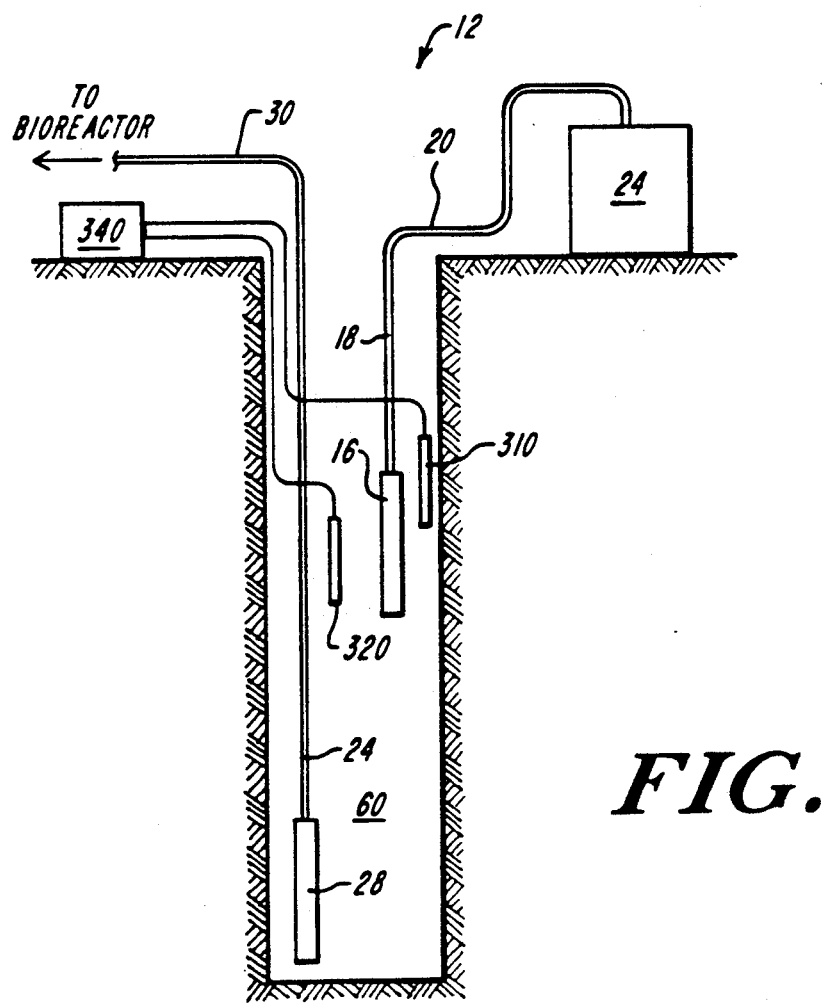
FIG. 2B is a partly schematic illustration of a dual pump subsurface pumping system useful in the invention.

Alternatively, a subsurface pumping system 12 which performs below-ground separation of a two-phase mixture may be employed. Referring to FIG. 2B, this subsurface pumping system 12 comprises a free product pump 16', connected to collection tank 24 by well pipe 18 and above-ground piping system 20, and water table depression pump 28, connected to bioreactor 34 by intake pipe 27 and piping system 30. A product detection probe 310 and water detection probe 320 provide data to control system 340 which in turn uses the data to control the rate at which subsurface pump system 12 removes fluid from contaminated site 38. A subsurface pump system 12 of the type described herein is manufactured by Keck Geophysical Instruments.

Figure 3A:
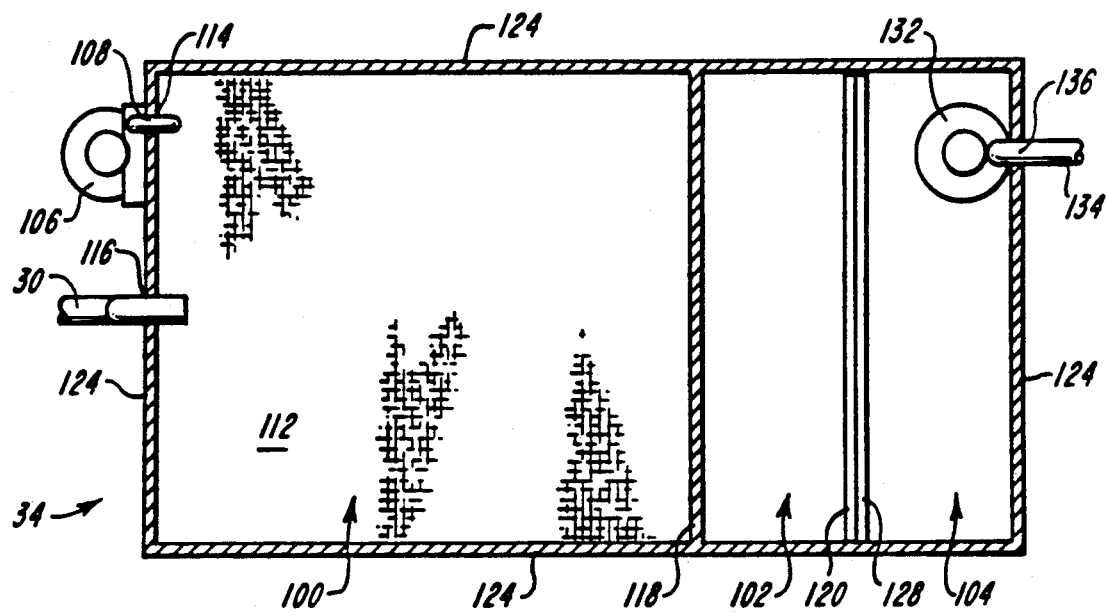
FIG. 3A is a partly schematic, top cross-sectional view of a bioreactor useful in the invention.
Figure 3B:
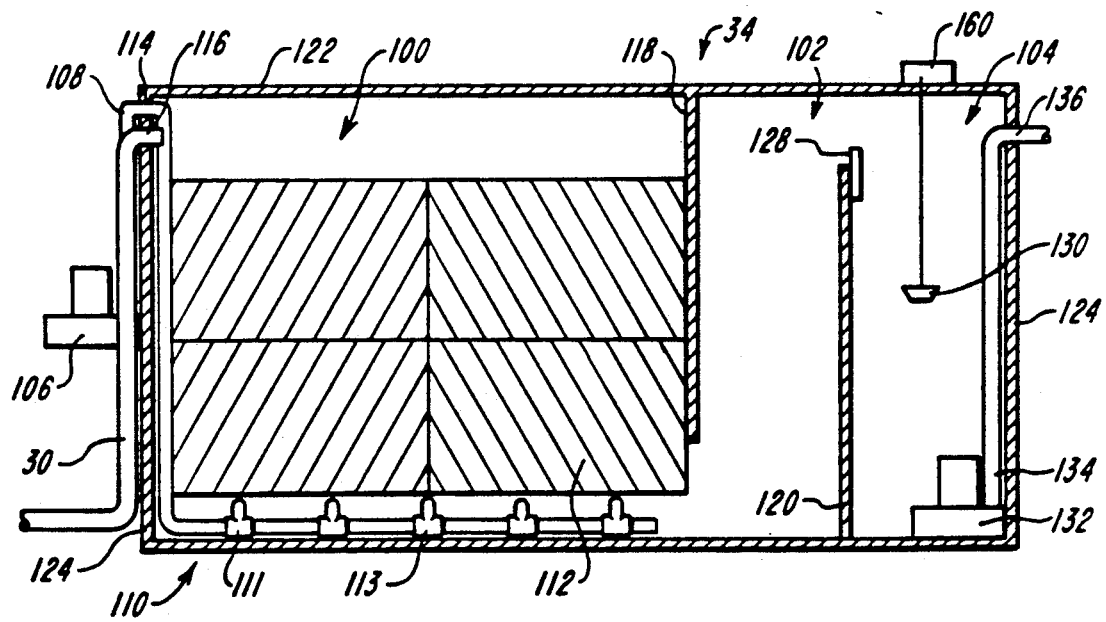
FIG. 3B is a partly schematic, side cross-sectional view of a bioreactor useful in the invention.

Referring to FIGS. 3A and 3B, the bioreactor 34 of the present invention is a portable vessel, preferably manufactured from explosion proof equipment and circuitry. The vessel is preferably about 1.5 meters wide, about 2 meters long, and about 1.75 meters high. Larger or smaller vessels may be constructed to accommodate varying levels of contamination and required groundwater flow rate. Preferably, bioreactor 34 may be sealed to control the escape of volatilized contaminants. Internally, bioreactor 34 comprises three chambers, treatment chamber 100, clarifier chamber 102, and wet-well chamber 104. Bioreactor walls 124, in conjunction with internal walls 118 and 120, segregate the above chambers. An adjustable weir 128 may be affixed to the upper edge of internal wall 120.

Treatment chamber 100 contains gas distribution system 110, a pH control system (not shown), a support media 112, and a culture of hazardous substance consuming microorganisms. The pH control system maintains the groundwater flowing through treatment chamber 100 within an optimal range for microbiological activity. Treatment chamber 100 also includes a first coupling 114, through which piping 108 enters bioreactor 34 and a second coupling 116, which receives piping system 30. Preferably couplings 114 and 116 are located such that pipes 108 and 30 enter above support media 112.

Gas distribution system 110 preferably includes a series of alternating pipe "T"s/gas diffusers 111 and interconnecting pipe joints 113. Gas diffusers 111 may be fabricated from a porous media, perforated pipe, or prefabricated high efficiency diffusers. To optimize oxygen transfer efficiency, and meet the oxygen demand of the bioremediating culture, an optimal number of gas diffusers 111 having fine (small) pores are installed within treatment chamber 100.

The support media 112 provides a fixed surface to which the bioremediating culture may attach. The microorganism's mechanism of attachment to support media 112 is not completely understood. The media may be manufactured from a semi-rigid material such as polyvinylchloride (PVC), however, other materials may be used. The presently preferred material is a fixed film media constructed of overlapping corrugated PVC sheets and forming a large surface area porous block structure. A preferred media is manufactured by Munters Corporation and sold under the registered trademark BIOdek.

The regenerative culture of hazardous substance consuming microorganisms typically includes bacteria, actinomycetes, fungi, algae, and mixtures thereof. The microorganisms may remain fixed to support media 112 throughout their life span, or during growth they may detach from support media 112 and slough off into the contaminated groundwater. The bacteria may be of a species indigenous to the hazardous substance contaminated site 38, genetically engineered, or mixtures of both. Nonpathogenic bacteria are preferred. Typical bacteria useful in the present invention include pseudomonas, Flavobacterium, Bacillus, Nocardia, Acinetobacter, Corynebacterium, Achromobacter, Mycobacterium, and Micrococcus. Other hazardous substance degrading microorganisms include actinomycetes, algae, and fungi. Also useful are enriched bacterial cultures selected on the basis of their ability to use a given hazardous substance as their sole carbon source. As will be appreciated by those skilled in the art, cultures of genetically engineered or otherwise enriched bacteria designed to use the given contaminating hazardous substance as their sole carbon source, results in faster remediation at lower costs than other currently available technologies.

Wet-well chamber 104 contains submersible effluent pump 132, which is connected to recirculation piping 134, and actuated by liquid level control 130. Submersible effluent pump 132 may be any low volume pump suitable for submersible use. Recirculation piping 134, which exits bioreactor 34 at coupling 136, connects submersible effluent pump 132 to aboveground effluent piping 36 and finally to recirculation well/infiltration gallery 65. Liquid level control 130 is proximate to the surface of the decontaminated groundwater which collects in wet-well chamber 104 and connected to a pump control switch 160. Liquid level control 130 and switch 160 interact to turn submersible pump 132 on and off. Effluent pump 132 may be eliminated in favor of a gravity driven system.

In operation the subsurface pumping system 12 and microbiological treatment system 14 interact to efficiently and quickly bioremediate a hazardous substance contaminated site. In particular, by removing the non-aqueous organic phase, i.e., free product, subsurface pumping system 12 protects the microbial culture from toxic overloadings of the hazardous substance. In addition, removal of the organic phase prevents it from acting as a reservoir of contaminants capable of maintaining the concentration of contaminants in the groundwater at prebioremediation levels for extended periods. These features permit users to maintain substantially continuous microorganism regeneration and biodegradation both above-ground and in situ, producing an efficient, safe, and fast-acting bioremediation system.

Upon arrival at contaminated site 38 recovery well 60 and recirculation well/infiltration gallery 65 are installed, and the operator arranges the apparatus as described above. A series of recovery wells 60 and recirculation wells/infiltration galleries 65 may be installed depending on the characteristics of the contaminant plume and subsurface geology. Next, the operator fills bioreactor 34 with recovered groundwater, engages blower 106, and introduces unacclimated activated sludge into treatment chamber 100 of bioreactor 34. As a result of interactions between the microbial population and the support media 112, a significant portion of the bacteria in the sludge attach to support media 112. Preferably, the bacterial culture is then supplemented with a bacterial culture which is acclimated to, and selectively degrades the hazardous substance. The culture is permitted to grow for approximately 24 to 48 hours before flow through of contaminated groundwater from the subsurface pumping system 12 is initiated.

Activation of the bioremediation apparatus 10 starts the groundwater bioremediation flow depicted in FIGS. 4A and 4B.

Referring to FIG. 4A, a bioremediation apparatus 10, having an integrated subsurface pumping system 12 and microbiological remediation system 14, is depicted. Subsurface pumping system 12 creates a cone of depression 22 in the contaminated groundwater 44. Cone of depression 22 is a depression of the groundwater level below the static water level along a relatively parabolic curve. Pumping system 12 uses pressurized air to pump a mixture of contaminated groundwater and free-product up well pipe 18. Referring to FIG. 2A, a two phase mixture including an aqueous phase (groundwater) and non-aqueous organic phase (free product) enter ports 202 and 204. Once chamber 240 fills completely, pump control 200 forces compressed air into chamber 240 via air line 230 and port 210. The compressed air forces valves 230 and 232 closed, and the mixture out port 208, up well pipe 18, and into above-ground piping system 20. Compressed air reduces mixing of, or formation of an emulsion by, the contaminated groundwater and hazardous substance. The mixture then flows into phase separator 24 where density differences between the groundwater and hazardous substance cause the materials to separate into distinct phases. The isolated hazardous substances may then be pumped via line 216 into holding tank 214 for eventual removal. The recovered groundwater, containing dissolved contaminants, flows through line 218, into piping system 30, and eventually bioreactor 34 where it is bioremediated.

The subsurface pumping system 12 and the microbiological treatment system 14 operate concurrently. To commence operation, contaminated groundwater isolated by phase separator 24 is pumped into the microbiological treatment system 14 via line 218 and piping system 30. As the contaminated groundwater flows through piping system 30 it is supplemented with a nutrient mixture pumped by nutrient feed pump 50 from tank 48. The nutrients fed into the groundwater are in the form of an aqueous solution of appropriate nitrogen, phosphorus, and, optionally, other inorganic salts necessary for maintenance of enhanced bioactivity. Preferred nitrogen containing compounds are $NH_4Cl$, $NH_4NO_3$, $NaNO_3$, or $(NH_4)_2SO_4$, although urea or urea-formaldehyde may also be used. Phosphorus is readily provided as $KH_2PO_4$, $Na_2HPO_4$, and the like.

After enrichment with nutrients, the groundwater flows into treatment chamber 100 of bioreactor 34. Concurrent with the introduction of groundwater, gas distribution system 110 forces air into treatment chamber 100 in the form of fine (small) bubbles. The diffused air dissolves into the groundwater. In bioreactor 34, the groundwater flows through support media 112 contacting the bacterial culture fixed thereto. In response to the injection of nutrients and contaminants, the bacterial culture grows and biodegrades the contaminants. The majority of the microorganisms remain fixed to support media 112 as the groundwater flows over the support media 112. Some of the microorganisms, however, detach from, or slough off, the support media 112 and disperse into groundwater. The fixed microorganisms continually grow replacing those microorganisms sloughed off; continual growth by the fixed bacterial cell population results in a substantially constant microbial biomass within bioreactor 34.

Upon reaching the bottom of treatment chamber 100, the now treated groundwater flows laterally into clarifier chamber 102. Gradually, clarifier chamber 102 fills with treated groundwater until the treated groundwater spills over adjustable weir 128 into wet-well chamber 104.

The treated groundwater, which contains dissolved gases, nutrients, and microorganisms, fills wet-well chamber 104 until the treated water surface reaches liquid-level control 130. Level control 130 is activated at a preset point and turns switch 160, and hence effluent pump 132, on. Effluent pump 132 pumps the treated groundwater into recirculation piping 134. Recirculation piping 134 may transfer the treated groundwater into either recirculation well/infiltration gallery 65 or a second, sequential, bioreactor 34 or polishing filter for further treatment. If the treated groundwater is pumped into recirculation well 65, it flows back into the contaminated site 38.

Alternatively, bioremediation apparatus 10 may be operated as shown in FIG. 4B. In operation, pumping system 12 creates a cone of depression 22, and selectively removes free-product phase 46. In particular, product detection probe 310 and water detection probe 320 interact with pump control system 340 to activate and deactivate pumping system 12 in response to the presence of a separate free product phase 46. Free product phase 46, is pumped by free product pump 16' into collection tank 24, via well pipe 18 and above-ground piping system 20, where it is stored until proper off-site disposal is available. Groundwater table depression pump 28 pumps groundwater contaminated with dissolved constituents of the hazardous substance up intake pipe 27, into piping system 30, and eventually into bioreactor 34. Bioreactor 34 functions to bioremediate the water as described above.

Bioremediation following the above procedures may be performed at ambient temperatures. Those skilled in the art will appreciate, however, that bioremediation is more efficient at the optimum temperatures for microbial growth and biodegradation. The preferred temperature may be determined empirically. Accordingly, to insure the maintenance of preferred temperatures in colder climates, the apparatus may be equipped with heating units (not shown) and insulation.

Upon release into the contaminated site 38, the recirculated microorganisms provide a seed culture for performing in situ bioremediation. Specifically, the microorganisms biodegrade contaminants dispersed in the resident groundwater and soil and rock strata 56. Preferably, the recirculated microorganisms flow toward intake well 60, thus establishing a closed-loop (or complete) bioremediation circulatory system. Alternatively, the microorganisms may randomly disperse into the soil and rock strata 56.

Bioremediation following the above procedure is effective for the treatment of a wide variety of hazardous substances. Typical hazardous substances which may be bioremediated using the process of the invention include:

a.) alcohols, e.g., isopropanol, ethanol, t-butanol, ethylene glycol;
b.) aromatics, e.g., benzene, toluene, ethylbenzene, xylenes;
c.) carbohydrates, e.g., glucose, fructose;
d.) ketones, e.g., methylethylketone;
e.) petroleum hydrocarbons, e.g., gasoline, diesel, fuel oils, motor oils, crude oil;
f.) phenols, e.g., chlorophenol;
g.) phthalates, e.g., o-phthalate;
h.) solvents, e.g., methylene chloride, acetone, stoddard solvent, tetrahydrofuran;
i.) chlorinated compounds, e.g., monochlorobenzene, 1,2-dichloroethane;
j ) detergents;
k.) and mixtures thereof.

It is recognized, however, that virtually any material which may be biodegraded may be treated with the apparatus and method of the present invention.

The above apparatus has several advantages resulting from the integration of the subsurface pumping system 12 and microbiological treatment system 14. In particular, the total system permits faster and more efficient bioremediation of sites than previously allowed by the prior art. Further, by integrating a subsurface pumping system 12 into the apparatus 10 the removal of potentially toxic concentrations of free product prior to entrance into the bioreactor is insured, thus protecting the microbial culture from toxic overloadings of the hazardous substance. The removal of the hazardous substance rich solution also prevents this material from increasing the contaminant's concentration in the groundwater. These features permit users to maintain substantially continuous microorganism regeneration and biodegradation both above-ground and in situ. Thus, the combination of these systems produces an efficient, safe, and fast-acting bioremediation system.

In view of the foregoing, it will be apparent to those skilled in the art that various changes and modifications may be made in the invention without departing from the spirit or scope thereof.

What is claimed is:

1. An apparatus for the continuous remediation of a site contaminated with a hazardous substance, the contaminated site comprising a groundwater region having said hazardous substance dissolved therein and a subsurface phase of said hazardous substance separate from said groundwater region, said apparatus comprising in interactive combination:

I) a pumping system, comprising a pump, for removing said hazardous substance contained in said subsurface phase separate from groundwater present at said site, said pump having an intake nozzle positioned at a subsurface location proximate to a groundwater/hazardous substance interference, said pumping system further comprising a collection tank for holding the output of said pumping system; and II) recirculating means for microbiologically treating said site by continuously biodegrading said hazardous substance dissolved in said groundwater, and recirculating said groundwater through said treated site, said recirculating means comprising:

a) a piping and pumping system for removing groundwater contaminated with said hazardous substance from below said groundwater/hazardous substance interface;

b) a bioremediation vessel, connected to said piping and pumping system and separate from said collection tank, for treating said removed groundwater to cause biodegradation of said hazardous substance, said vessel having a gas injection system, a nutrient addition system, and a continuously regenerating culture of microorganisms which consumes said hazardous substance, said culture comprising a film of microorganisms fixed to a support medium in said vessel and microorganisms arising from said fixed microorganisms which slough off said support medium and disperse into the treated ground water; and c) a piping and pumping system for recirculating groundwater treated in said vessel and containing said microorganisms, from said vessel though the hazardous substance-contaminated site;

whereby said apparatus continuously removes high concentrations of a hazardous substance from said interface and from said groundwater while protecting said microorganisms from toxic overloadings of the hazardous substance and dissolved constituents of said hazardous substance in said groundwater.

2. The apparatus of claim 1 wherein said microorganisms fixed to said support media are a substantially constant microbial biomass.

3. The apparatus of claim 1 wherein said treated groundwater comprises said sloughed off microorganisms, dissolved nutrients, and gases.

4. The apparatus of claim 1 wherein said pumping system comprises a float-controlled holding tank in fluid connection with the pump.

5. The apparatus of claim 1 wherein said pumping system comprises a phase separator tank in fluid connection with the pump.

6. The apparatus of claim 5 wherein said pumping system further comprises a means for connecting said phase separator tank to said vessel, said means serving to transport contaminated groundwater to the vessel.

7. The apparatus of claim 1 wherein said gas injection system of said vessel comprises a fine bubble diffuser.

* * * * *